Figure 1:
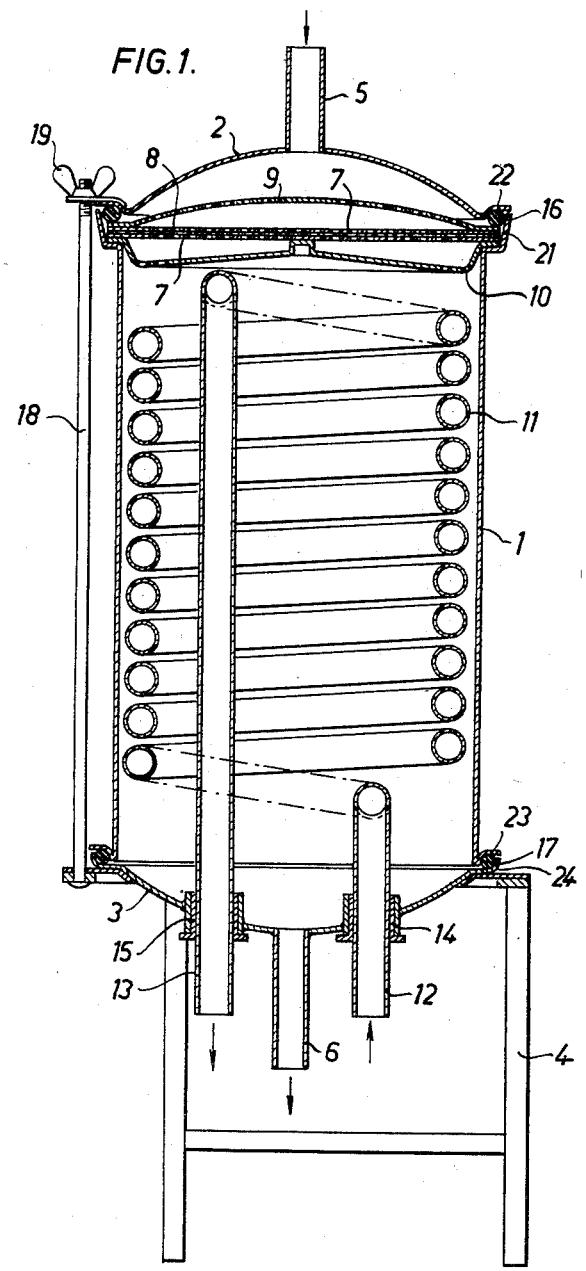

April 12, 1960     K. E. OLANDER     2,932,490
MILK STRAINER AND COOLER
Original Filed Dec. 17, 1952     2 Sheets-Sheet 1

United States Patent Office
2,932,490
Patented Apr. 12, 1960

2,932,490

MILK STRAINER AND COOLER

Karl Erik Olander, Norrkoping, Sweden, assignor to Aktiebolaget Manus, Norrkoping, Sweden, a manufacturing company of Sweden Continuation of abandoned application, Serial No. 326,416, December 17, 1952. This application April 15, 1957, Serial No. 652,797

1 Claim. (Cl. 257—180)

The present invention relates to an apparatus for cooling and straining milk.

The present application is a continuation of my prior copending United States patent application Serial No. 326,416, filed December 17, 1952, and now abandoned.

In machine milking plants of the type which are provided with a milk conduit, usually stationary, to which the milking machines or the teat cup units of the plant are connected during the milking operation, and in which suction is maintained as by means of a vacuum pump connected to the conduit, it has been proposed to connect to the said milk conduit, a straining apparatus comprising a closed vessel in which a straining device is provided, and to cool the strained milk as by collecting it in a series of interconnected milk transport cans which are connected between the straining apparatus and the vacuum pump and which are cooled by outside means, as by the cans being placed in a cooling basin filled with cold water. It has been found, however, that the handling of the milk transport cans, such as placing the empty cans in the basin and securing them in position therein, and removing the filled cans from the basin, is comparatively time-wasting and requires a considerable amount of manual labour.

It is an object of the present invention to provide a milk straining and cooling apparatus which is particularly adapted for use in machine milking plants of the type above stated, and by means of which a continuous cooling and straining of the milk can be efficiently brought about according as the flow of milk leaves the milk conduit of the plant.

Another object of the invention is to provide an apparatus of the kind set forth which may be easily disassembled for cleaning purposes and equally easily reassembled.

The milk straining and cooling apparatus according to this invention comprises an upright substantially cylindrical closed vessel adapted to be connected in series circuit with the vacuum milk line of said machine milking system, and a cooling coil disposed within said vessel, said vessel constituting three detachably arranged elements being characterized by ease of disassembly for cleaning purposes and comprising a bottom having a milk outlet tube attached to said bottom, a continuous imperforate substantially cylindrical shell detachably supported by said bottom, and a cover detachably supported by the upper end of said shell and having a milk inlet tube attached to said cover, the combination of means for assembling said cover, shell and bottom to one another in air tight relationship, said means comprising the provision of top and bottom outwardly extending peripheral flanges on said cylindrical shell, the provision of outwardly extending peripheral flanges on said cover and bottom elements for cooperation with the respective flanges of said cylindrical shell, and sealing rings disposed between each pair of cooperating flanges to provide an air tight connection between said three elements when said cover and bottom elements are urged toward each other by the pressure of the atmosphere when said vessel is connected into a vacuum milk line by means of said milk inlet and milk outlet tubes, an upright substantially cylindrical cooling coil formed of a helically coiled tube, the outer diameter of said cooling coil being smaller than the inner diameter of said shell, said cooling coil being positioned within said shell concentrically with and at a radial distance from the inner surface of said shell and being entirely free from and unsupported by the shell, substantially vertical inflow and outflow tubes connected to said cooling coil and passing through and connected to said bottom to form the sole support of said cooling coil, a strainer device positioned in the upper portion of said vessel below said milk inlet tube, and distributing means positioned in said vessel below said strainer device above said cooling coil so as to receive the milk passing through said strainer device, said distributing means being provided with a series of outflow passages positioned vertically above the upper turn of said cooling coil to allow the milk to flow down in a vertical direction from said outflow passages to and over said cooling coil, and said strainer device and distributing means having peripheral marginal portions received between the top peripheral flange of said cylindrical shell and said sealing ring to hold the same in position and to permit removal thereof for cleaning purposes when said vessel elements are disassembled.

This arrangement of the combined straining and cooling apparatus according to the invention provides the advantage that the strained milk is directed to the cooling coil in such manner that the milk will flow vertically downward and be evenly distributed over practically the entire surfaces of the turns of the tube which form the cooling coil, from one turn thereof to the next, in intimate contact with the surfaces thereof, so that an efficient cooling of the milk is ensured. The strained and cooled milk may then flow, under the influence of the suction produced by the vacuum, to a series of interconnected milk transport cans or to a collecting receptacle connected to the outlet tube of the straining and cooling apparatus.

Figure 2:
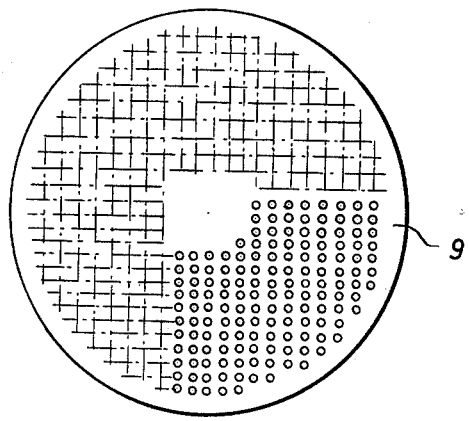
Figure 3:
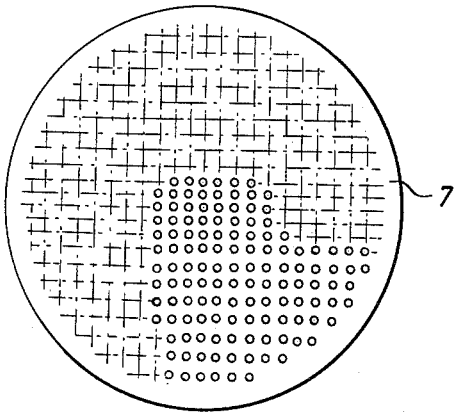
Figure 4:
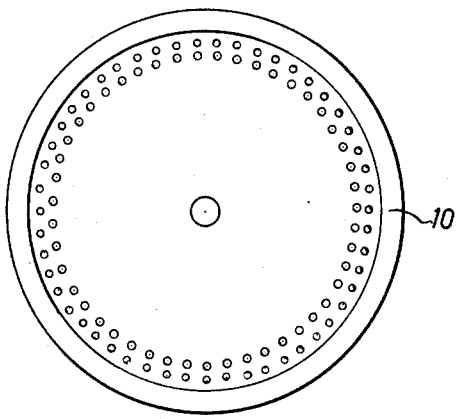

A constructional form of a milk straining and cooling apparatus according to this invention is illustrated by way of example in the accompanying drawings. Fig. 1 shows a vertical section through the apparatus. Fig. 2 shows a plan view of a perforated distributing plate. Fig 3 shows a plan view of a perforated strainer plate, and Fig. 4 shows a plan view of a distributing bowl.

As illustrated in Fig. 1 the vessel of the apparatus comprises a substantially cylindrical sheet metal wall structure or shell 1 which is provided at its upper end with a detachable cover 2 and at its lower end with a detachable bottom 3. The vessel is supported by a stand 4. The cover 2 is provided with a milk inlet tube 5 for connecting the apparatus to a milk conduit from the milking machines or teat cup units of the plant, and the bottom 3 is provided with a central milk outlet tube 6 which serves to connect the apparatus to a series of interconnected milk transport cans which, in turn, are connected to the usual vacuum pump, not shown in the drawing. Positioned in the upper portion of the vessel is a strainer device which, in the instance illustrated, comprises two plane strainer plates 7 one of which is shown in Fig. 3 in plan view. Placed between the said strainer plates is a filter 8 of cotton or the like. The strainer plates 7 and the filter 8 extend practically over the entire cross-sectional area of the vessel. A slightly arched distributing plate 9 which serves to distribute the inflowing milk uniformly over the strainer device, is positioned over the said device with its rim resting against the upper strainer plate 7. The central portion of the distributing plate 9 which is located immediately below the inlet tube 5, is unperforated, as shown in Fig. 2. Positioned below the strainer device 7, 8 is a slightly arched distributing bowl 10 which is shown in Fig. 4 in plan view. The central portion of the distributing bowl 10 engages the under surface of the lower strainer plate 7.

Provided in the vessel directly below the said distributing bowl 10 is an upright substantially cylindrical milk cooling coil 11 formed of a helically coiled tube having a comparatively large diameter. The lower end of the coil 11 is connected to an inflow tube 12 for a suitable cooling fluid, such as cold water, and the upper end of the coil 11 is connected to an outflow tube 13 for the cooling fluid. The inflow tube 12 and the outflow tube 13 pass through the bottom 3 to which they are sealed by means of any suitable sealing means 14 and 15. As shown in the drawing, the distributing bowl 10 is perforated only within an annular zone which is located vertically above the turns of the cooling coil 11 so that the milk will flow down over the turns of the coil in intimate contact therewith and will thus be cooled quickly and efficiently.

The upper end of the wall 1 is provided with a laterally projecting flange 21 which is formed in such manner that the distributing bowl 10, the strainer plates 7, and the distributing plate 9 can rest upon said flange and be pressed against the same by a rubber ring 16 inserted between said flange 21 and a flange 22 on the cover 2 and which provides the necessary tight seal between the wall 1 and the cover 2. A similar rubber ring 17 is inserted between a flange 23 on the lower end of the wall 1 and a flange 24 at the outer edge of the bottom 3. The cover 2, the wall 1, and the bottom 3 are held together in assembled positions relatively to one another by means of a suitable number of screw bolts 18 having wing nuts 19. In this way the vessel 1, 2, 3 is closed air-tightly, but it can easily be disassembled when required for the purpose of cleaning its interior parts. The cooling coil 11 is preferably permanently attached to the bottom 3 and may be flushed clean simultaneously with the bottom, whereas the strainer plates and the distributing plate and bowl may be cleaned separately.

I claim:

In an easily disassembled and reassembled milk straining and cooling device of the type comprising an upright substantially cylindrical vessel to be passed by a downward flow of the milk, and straining and cooling elements in said vessel, the combination of said elements and of auxiliary means for allowing the insertion of the device into the vacuum controlled milk conduit of a machine milking system while maintaining the easy disassembling and reassembling qualities of the device, said combination comprising a separate vessel bottom member and means for supporting said bottom member at a suitable level, an upright, substantially cylindrical cooling coil having inflow and outflow tubes for a cooling agent passing vertically through said bottom and being connected thereto so as to allow the bottom to form the sole support for the cooling coil, said bottom member having an outwardly projecting peripheral flange, an open-topped and open-bottomed substantially cylindrical separate vessel shell to be loosely supported in an airtight manner by said flange of the bottom member, the shell having an outwardly projecting peripheral flange at its bottom end and a packing ring being inserted between said flanges to effect an airtight sealing between the shell and the bottom member while the shell is detachably supported by the bottom member, the shell surrounding the cooling coil concentrically at a small distance therefrom, the shell having at its open top end an outwardly and upwardly projecting flange including an annular offset and a slightly conical side wall upstanding therefrom, a bowl-shaped distributing member loosely resting by its peripheral portion on said offset, said distributing member having a lowermost annular portion situated right above the cooling coil and having apertures formed in said portion to allow milk to pass therethrough onto said coil and also having a centrally located upwardly extending portion, a strainer device loosely resting on the peripheral portion of said bowl-shaped distributor and on said upwardly extending central portion so as to extend over the entire cross-section area of the shell, an arch-shaped distributor body loosely resting on the peripheral portion of the strainer, said body being apertured all over its area except in a middle portion thereof, a packing ring resting on the peripheral portion of said arch-shaped distributor while contacting the side wall of the top flange of the shell, a cover having a peripheral flange for resting on said packing ring, and means provided externally of the shell for securing the elements in their assembled state, the cover having a milk inlet tube and the bottom member having a milk outlet tube for permitting the insertion of the device in the vacuum milk conduit of the system.

References Cited in the file of this patent

UNITED STATES PATENTS

| 806,696 | Moody | Dec. 5, 1905 |
| 918,862 | Johnson | Apr. 20, 1909 |
| 1,153,170 | Morse | Sept. 7, 1915 |
| 1,301,775 | Wilson | Apr. 20, 1919 |
| 1,713,456 | Strindlund | May 14, 1929 |
| 2,196,848 | Babson et al. | Mar. 25, 1937 |
| 2,340,302 | Brant | Feb. 1, 1944 |
| 2,650,427 | Mathiesen | Sept. 1, 1953 |

FOREIGN PATENTS

| 103,555 | Australia | Apr. 7, 1938 |